(12) United States Patent
Thisted et al.

(10) Patent No.: US 9,172,321 B2
(45) Date of Patent: Oct. 27, 2015

(54) ELECTRICAL YAW DRIVE FOR A WIND TURBINE, WIND TURBINE AND METHOD FOR OPERATING A WIND TURBINE

(71) Applicants: Jan Thisted, Tjele (DK); Soeren Vinther, Herning (DK)

(72) Inventors: Jan Thisted, Tjele (DK); Soeren Vinther, Herning (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 223 days.

(21) Appl. No.: 13/786,529

(22) Filed: Mar. 6, 2013

(65) Prior Publication Data
US 2013/0241202 A1    Sep. 19, 2013

(30) Foreign Application Priority Data

Mar. 15, 2012  (EP) ..................................... 12159719

(51) Int. Cl.
*H02P 3/22* (2006.01)
*H02P 9/04* (2006.01)
*F03D 7/02* (2006.01)
*F03D 7/00* (2006.01)
*H02P 3/12* (2006.01)

(52) U.S. Cl.
CPC .. *H02P 9/04* (2013.01); *F03D 7/00* (2013.01); *F03D 7/0204* (2013.01); *H02P 3/12* (2013.01); *H02P 3/22* (2013.01); *F05B 2270/1071* (2013.01); *F05B 2270/602* (2013.01); *Y02E 10/723* (2013.01)

(58) Field of Classification Search
USPC ......... 318/375, 379, 380, 430; 290/43, 44, 55
See application file for complete search history.

(56) References Cited

U.S. PATENT DOCUMENTS

| 3,991,352 | A | * | 11/1976 | Fry et al. ......................... 318/759 |
| 5,278,773 | A | * | 1/1994 | Cousineau ..................... 700/287 |
| 7,436,083 | B2 | * | 10/2008 | Shibata et al. .................. 290/44 |
| 2009/0068013 | A1 | * | 3/2009 | Birkemose et al. ............. 416/31 |
| 2011/0299998 | A1 | * | 12/2011 | Yoshida ......................... 416/246 |
| 2011/0311359 | A1 | | 12/2011 | Bjork | |

FOREIGN PATENT DOCUMENTS

DE     10206826 A1     8/2003
DE   102010039332 A1   3/2011

OTHER PUBLICATIONS

Asynchrongenerator, Anonymous "Asynchrongenerator", Internet Article, XP002681169, URL http //web archive org/web/20090419215410/http //de wikipedia org/wiki/Asynchrongenerator, 2009, Apr. 19, 2009.

* cited by examiner

*Primary Examiner* — Bentsu Ro

(57) ABSTRACT

An electrical yaw drive for a wind turbine is described, wherein the wind turbine includes a wind turbine nacelle and a wind turbine tower. The electrical yaw drive has an asynchronous motor, an excitation capacitor bank and dump loads, wherein the excitation capacitor bank and the dump loads are electrically connectable to windings of the asynchronous motor. Furthermore, a wind turbine with such an electrical yaw drive and a method for operating such a wind turbine are described.

13 Claims, 2 Drawing Sheets

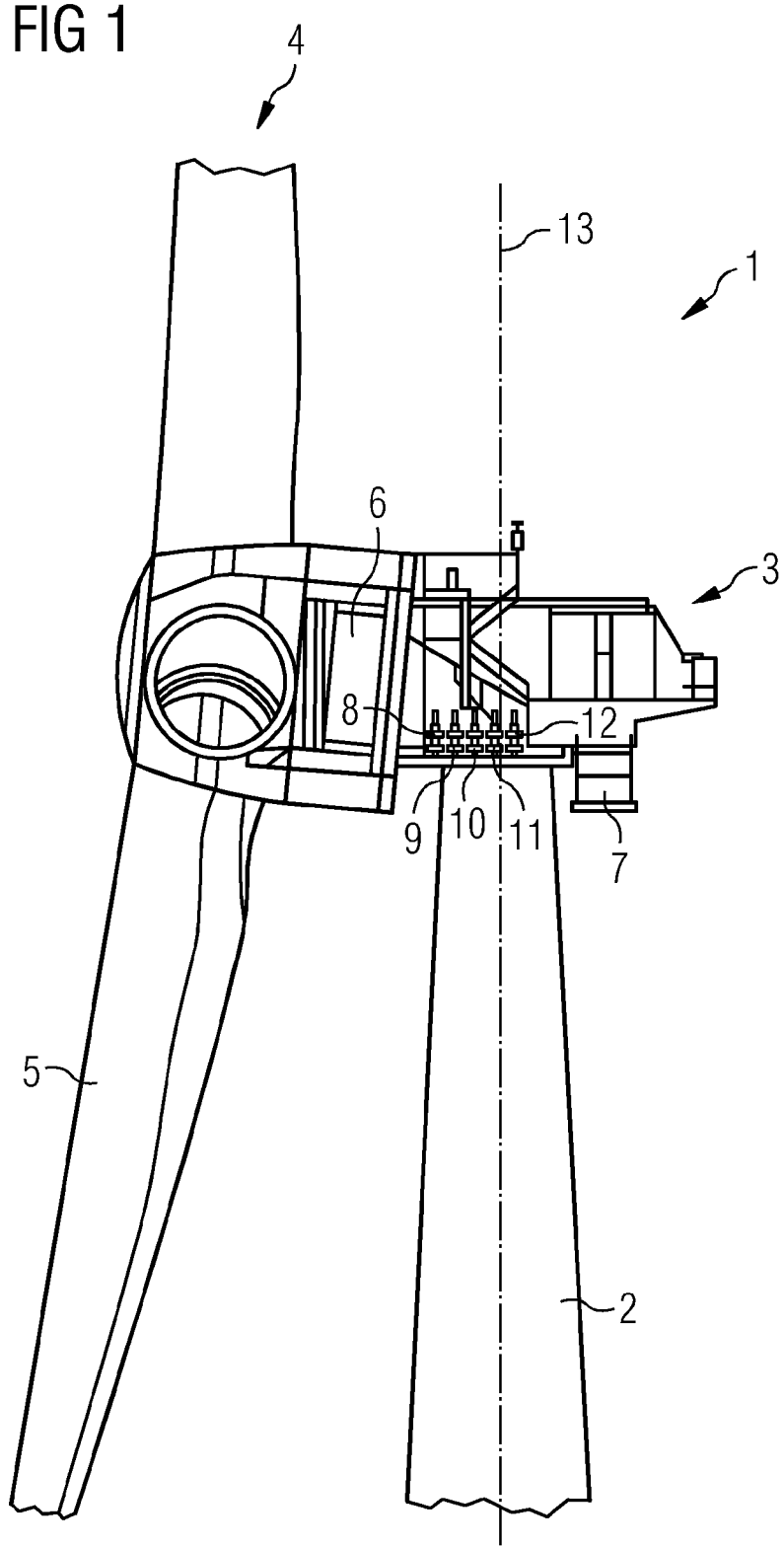

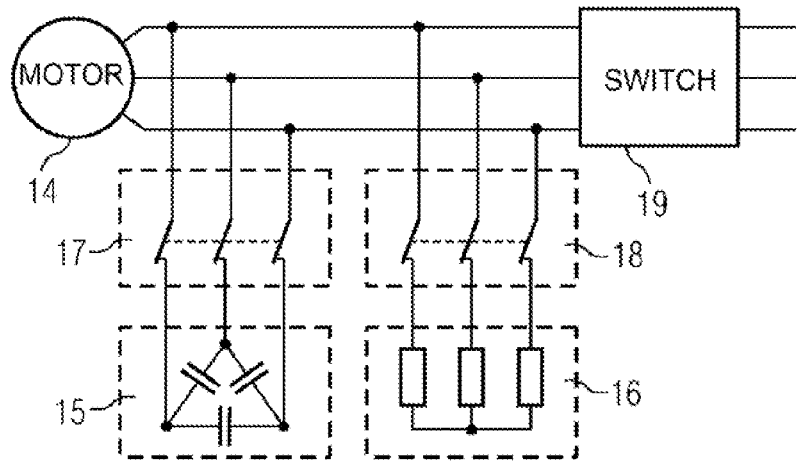
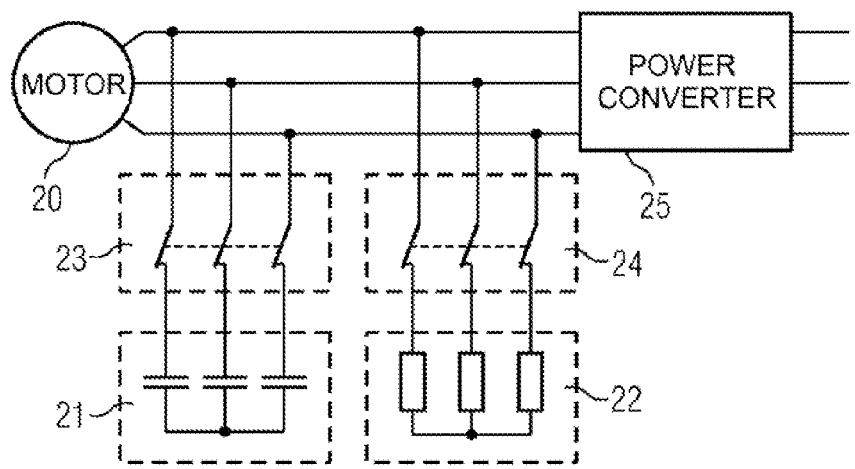
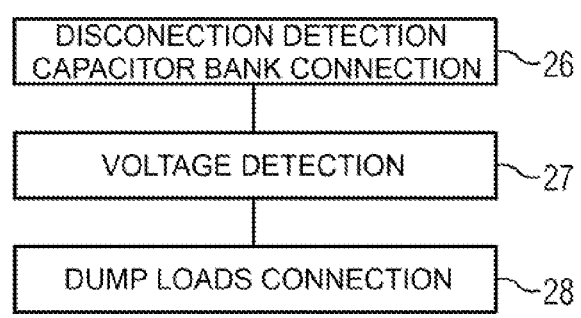

ELECTRICAL YAW DRIVE FOR A WIND TURBINE, WIND TURBINE AND METHOD FOR OPERATING A WIND TURBINE

CROSS REFERENCE TO RELATED APPLICATIONS

This application claims priority of European Patent Application No. 12159719.9 EP filed Mar. 15, 2012. All of the applications are incorporated by reference herein in their entirety.

FIELD OF INVENTION

An electrical yaw drive for pivoting a wind turbine nacelle around the axis of a wind turbine tower, a wind turbine and a method for operating a wind turbine are provided.

ART BACKGROUND

Wind turbines typically comprise a wind turbine tower and a wind turbine nacelle, which carries the wind turbine rotor having a horizontal axis and the wind turbine generator.

High rotational speeds of the wind turbine nacelle can lead to severe loads on the wind turbine structure, in particular in combination with a rotating wind turbine rotor and wind turbine generator.

Wind turbine nacelle rotation may be limited with a mechanical brake system, which is able to prevent the wind from turning the wind turbine nacelle in an uncontrolled manor.

Furthermore, electrical yaw drives are provided, which may on the one hand pivot the wind turbine nacelle around the vertical axis of the wind turbine tower such that the orientation of the wind turbine rotor follows the wind direction. On the other hand the torque of the electrical yaw drives may be controlled via power converters to limit the rotational speed of the wind turbine nacelle.

However, mechanical brake systems go along with regular maintenance. Power converters may on the one hand get tripped up and on the other hand depend on power provided to them.

SUMMARY OF THE INVENTION

Hence, there may be a need for an electrical yaw drive and a method for operating a wind turbine, which impede uncontrolled pivoting of the wind turbine nacelle with a high reliability and reduced costs.

This need may be met by the subject matter according to the independent claims Embodiments are described by the dependent claims.

According to a first aspect, there is provided an electrical yaw drive for a wind turbine, wherein the wind turbine comprises a wind turbine nacelle and a wind turbine tower, wherein the electrical yaw drive comprises an asynchronous motor, an excitation capacitor bank and dump loads, and wherein the excitation capacitor bank and the dump loads are electrically connectable to windings of the asynchronous motor.

According to a first exemplary embodiment, the electrical yaw drive is a brakeless electrical yaw drive.

A brakeless electrical yaw drive is to be understood as an electrical yaw drive, which does not comprise a friction brake or an eddy current brake. Electrical yaw drive brakes require regular maintenance to ensure their operability. Hence a brakeless electrical yaw drive may reduce maintenance costs.

According to a second exemplary embodiment of the electrical yaw drive, the excitation capacitor bank is configured to be connectable to the windings of the asynchronous motor in form of a delta-connection.

Connecting the excitation capacitor bank to the windings of the asynchronous motor in form of a delta-connection may be particularly useful if the wind turbine is operated with an IT (isolé terre) earthing scheme.

According to another exemplary embodiment of the electrical yaw drive, the excitation capacitor bank is configured to be connectable to the windings of the asynchronous motor in form of a star-connection.

Connecting the excitation capacitor bank to the windings of the asynchronous motor in form of a star-connection may be useful if the wind turbine is operated with an TN (terre neutre) earthing scheme.

According to further exemplary embodiment of the electrical yaw drive, the excitation capacitor bank and/or the dump loads are electrically connectable to the windings of the asynchronous motor via normally closed contactors. This embodiment may have the advantage, that it comprises only passive components and allows for a particularly high reliability.

According to yet another exemplary embodiment of the electrical yaw drive, the dump loads are electrically connectable to the windings of the asynchronous motor via normally open contactors.

This may allow for slow movement of the electrical yaw drive in case of a grid or power converter failure. Accordingly, the wind turbine nacelle may pivot around the wind turbine tower axis to follow the wind direction.

According to a second aspect, there is provided a wind turbine comprising an electrical yaw drive according to any of the above-mentioned embodiments, wherein the asynchronous motor is powered via a power converter.

The power converter may control the torque on the electrical yaw drive. Furthermore, the power converter may be set operational to track the target yaw direction at any time.

According to a third aspect, there is provided a wind turbine comprising an electrical yaw drive according to any of the above-mentioned embodiments and a wind turbine generator, wherein the asynchronous motor is powered via a wind turbine generator supply voltage.

The wind turbine generator supply voltage may in particular be the grid voltage. The grid voltage is the voltage in the grid connecting several wind turbines. The grid voltage may be available on the wind turbine even if the wind turbine generator is disconnected from the grid and stopped.

Directly powering the electrical yaw drive with the wind turbine generator supply voltage may reduce the complexity of the control mechanism for the electrical yaw drive. However, the electrical yaw drive may limit wind turbine nacelle pivoting speed even in the case of a lost grid connection.

According to a forth aspect, there is provided a method for operating a wind turbine according to an exemplary embodiment described above. The method comprises automatically connecting the excitation capacitor bank to the windings of the asynchronous motor upon detection of an electrical disconnection and automatically connecting the dump loads to the windings of the asynchronous motor upon detection of an electrical disconnection.

According to an exemplary embodiment, the method comprises detecting a generated voltage after connecting the excitation capacitor bank to the windings of the asynchronous motor and connecting the dump loads to the windings of the asynchronous motor if the generated voltage exceeds a predetermined threshold voltage.

Connecting the dump loads only if the generated voltage exceeds a predetermined threshold voltage may allow for low speeds of the electrical yaw drive such that a wind turbine nacelle may align with the wind direction. Accordingly, wind resistance of the wind turbine may be reduced. The generated voltage increases with the speed of the asynchronous motor. If it becomes too important dump loads will prevent further acceleration of the asynchronous motor and the wind turbine nacelle.

It has to be noted that embodiments have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects are apparent from the examples of embodiment to be described hereinafter and are explained with reference to the examples of embodiment.

BRIEF DESCRIPTION OF THE DRAWINGS

FIG. 1 shows a wind turbine.
FIG. 2 shows a first exemplary embodiment of an electrical yaw drive.
FIG. 3 shows a second exemplary embodiment of an electrical yaw drive.
FIG. 4 shows an exemplary embodiment of a method for operating a wind turbine

DETAILED DESCRIPTION

FIG. 1 shows a wind turbine 1 comprising a wind turbine tower 2 and a wind turbine nacelle 3. The wind turbine nacelle 3 carries inter alia a wind turbine rotor 4 with its wind turbine blades 5, a wind turbine generator 6, a wind turbine transformer 7, and electrical yaw drives 8, 9, 10, 11, and 12. Via the electrical yaw drives 8, 9, 10, 11, and 12 the wind turbine nacelle 3 may be pivoted around the vertical axis 13 such that the wind turbine rotor 4 may be optimally oriented towards the wind direction.

Pivoting the wind turbine 3 around the vertical axis 13 with a rotating wind turbine rotor 4 (and wind turbine generator 6) may induce high gyroscopic loads on the structure of the wind turbine 1. Hence, rotating speed of the wind turbine nacelle 3 around the vertical axis 13 has to be limited. Furthermore, even with a non-rotating wind turbine rotor 4 uncontrolled pivoting of the wind turbine nacelle 3 has to be avoided due to the high mass of the wind turbine rotor 4, wind turbine generator 6 and wind turbine transformer 7.

According to a first exemplary embodiment, the electrical yaw drives 8, 9, 10, 11, 12 may be construed in a way schematically depicted in FIG. 2.

The electrical yaw drive according to FIG. 2 comprises an asynchronous motor 14, an excitation capacitor bank 15, and dump loads 16. The excitation capacitor bank 15 is configured to be connectable to the windings of the asynchronous motor 14 in form of a delta-configuration via the normally closed contactors 17. Similarly, the dump loads 16 may be connected to the windings of the asynchronous motor 14 via normally open connectors 18. The asynchronous motor 14 is directly to the wind turbine generator supply voltage via switch 19.

When switch 19 is open and/or the wind turbine generator supply voltage is zero due to a grid failure there is no activation power available for the normally closed contactors 17. Hence, excitation capacitor bank 15 will automatically connect to the windings of the asynchronous motor 14 and establishes magnetizing flux within the asynchronous motor 14. Accordingly, the asynchronous motor 14 works as a generator and generates a voltage. This voltage causes the normally open contactors 18 to close. Hence, dump loads 16 are connected to the windings of the asynchronous motor 14 working as a generator. The excitation capacitor bank 15 and the dump loads 16 impede high rotation speeds of the asynchronous motor 14 as power needed for further acceleration is absorbed by the dump loads 16. Thus, even in the case of power failure a heavy wind impact on the wind turbine nacelle 13 cannot turn it around the vertical axis 13 in an uncontrolled manner Accordingly, the electrical yaw drive according to the first embodiment may help to reduce uncontrolled loads on the structure of the wind turbine 1.

FIG. 3 shows a further exemplary embodiment of an electrical yaw drive. The electrical yaw drive according to FIG. 3 comprises an asynchronous motor 20, an excitation capacitor bank 21 and dump loads 22, too. The excitation capacitor bank 21 is again connectable to the windings of the asynchronous motor 14 via normally closed contactors 23. However, in this exemplary embodiment the excitation capacitor bank 21 has a star-configuration. The dump loads 22 are connectable to the windings of the asynchronous motor 20 via normally closed contactor 24. In case the power converter 25 does not furnish any voltage to the asynchronous motor 20 and the normally closed contactors 23, 24 the later will remain closed. Accordingly, the asynchronous motor 20 will work as a generator, which power is absorbed by dump loads 22 and uncontrolled movement of the wind turbine nacelle 3 impeded.

FIG. 4 shows in a very schematic form an exemplary embodiment of a method for operating a wind turbine as has been described hereinbefore. In a first detection step 26 an electrical disconnection of an electrical yaw drive is detected and an excitation capacitor bank is automatically connected to windings of an asynchronous motor of the electrical yaw drive. In a second detection step 27 a voltage generated by the asynchronous motor now working as a generator is detected and in a third absorption step 28 dump loads are connected to the windings of the asynchronous motor if the generated voltage exceeds a predetermined threshold voltage.

As the exemplary embodiments described hereinbefore may impede unintentional pivoting of the wind turbine nacelle 3, mechanical brakes may be omitted.

The illustration in the drawing is schematically.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

We claim:
1. An electrical yaw drive for a wind turbine, wherein the wind turbine comprises a wind turbine nacelle and a wind turbine tower, the electrical yaw drive comprising:
 an asynchronous motor,
 an excitation capacitor bank and
 dump loads, wherein the excitation capacitor bank and the dump loads are electrically connectable to windings of the asynchronous motor.

2. The electrical yaw drive according to claim 1, wherein the electrical yaw drive is a brakeless electrical yaw drive.

3. The electrical yaw drive according to claim 1, wherein the excitation capacitor bank is configured to be connectable to the windings of the asynchronous motor in form of a delta-connection.

4. The electrical yaw drive according to claim 1, wherein the excitation capacitor bank is configured to be connectable to the windings of the asynchronous motor in form of a star-connection.

5. The electrical yaw drive according to claim 1, wherein the excitation capacitor bank and/or the dump loads are electrically connectable to the windings of the asynchronous motor via closed contactors.

6. The electrical yaw drive according to claim 1, wherein the dump loads are electrically connectable to the windings of the asynchronous motor via open contactors.

7. A wind turbine, comprising:
an electrical yaw drive according to claim 1.

8. The wind turbine according to claim 7, further comprising:
a power converter,
wherein the asynchronous motor is powered via the power converter.

9. The wind turbine according to claim 7, further comprising:
a wind turbine generator,
wherein the asynchronous motor is powered via a wind turbine generator supply voltage.

10. The wind turbine according to claim 7, wherein the wind turbine comprises the wind turbine nacelle and the wind turbine tower,
wherein the yaw drive is configured to receive electrical power, which causes the yaw drive to rotate the wind turbine nacelle relative to the wind turbine tower,
wherein responsive to a disconnection of electrical power from the yaw drive, the excitation capacitor bank is operatively configured to automatically connect to the windings of the asynchronous motor,
wherein responsive to the yaw drive generating a voltage that exceeds a predetermined threshold voltage after the excitation capacitor bank is connected to the windings of the asynchronous motor, the dump loads are operatively configured to automatically connect to the windings of the asynchronous motor,
wherein connection of the excitation capacitor bank and the dump loads to the windings of the asynchronous motor limits rotating speed of the wind nacelle relative to the wind turbine tower.

11. A method of operating a wind turbine including a nacelle, a wind turbine tower, and an electrical yaw drive that includes an asynchronous motor, comprising:
automatically connecting an excitation capacitor bank to windings of the asynchronous motor upon detection of an electrical disconnection, and
automatically connecting dump loads to the windings of the asynchronous motor upon detection of an electrical disconnection.

12. The method according to claim 11, further comprising:
detecting a generated voltage after connecting the excitation capacitor bank to the windings of the asynchronous motor, and
connecting the dump loads to the windings of the asynchronous motor when the generated voltage exceeds a predetermined threshold voltage.

13. The method according to claim 12, wherein the yaw drive includes the excitation capacitor bank and the dump loads, wherein the excitation capacitor bank and the dump loads are electrically connectable to the windings of the asynchronous motor, wherein prior to the detection of the electrical disconnection, further comprising:
providing electrical power to the yaw drive, which causes the yaw drive to rotate the wind turbine nacelle relative to the wind turbine tower, and
disconnecting the electrical power from the yaw drive,
wherein connecting the excitation capacitor bank and the dump loads to the windings of the asynchronous motor limits rotating speed of the wind nacelle relative to the wind turbine tower.

\* \* \* \* \*